Patented May 27, 1930

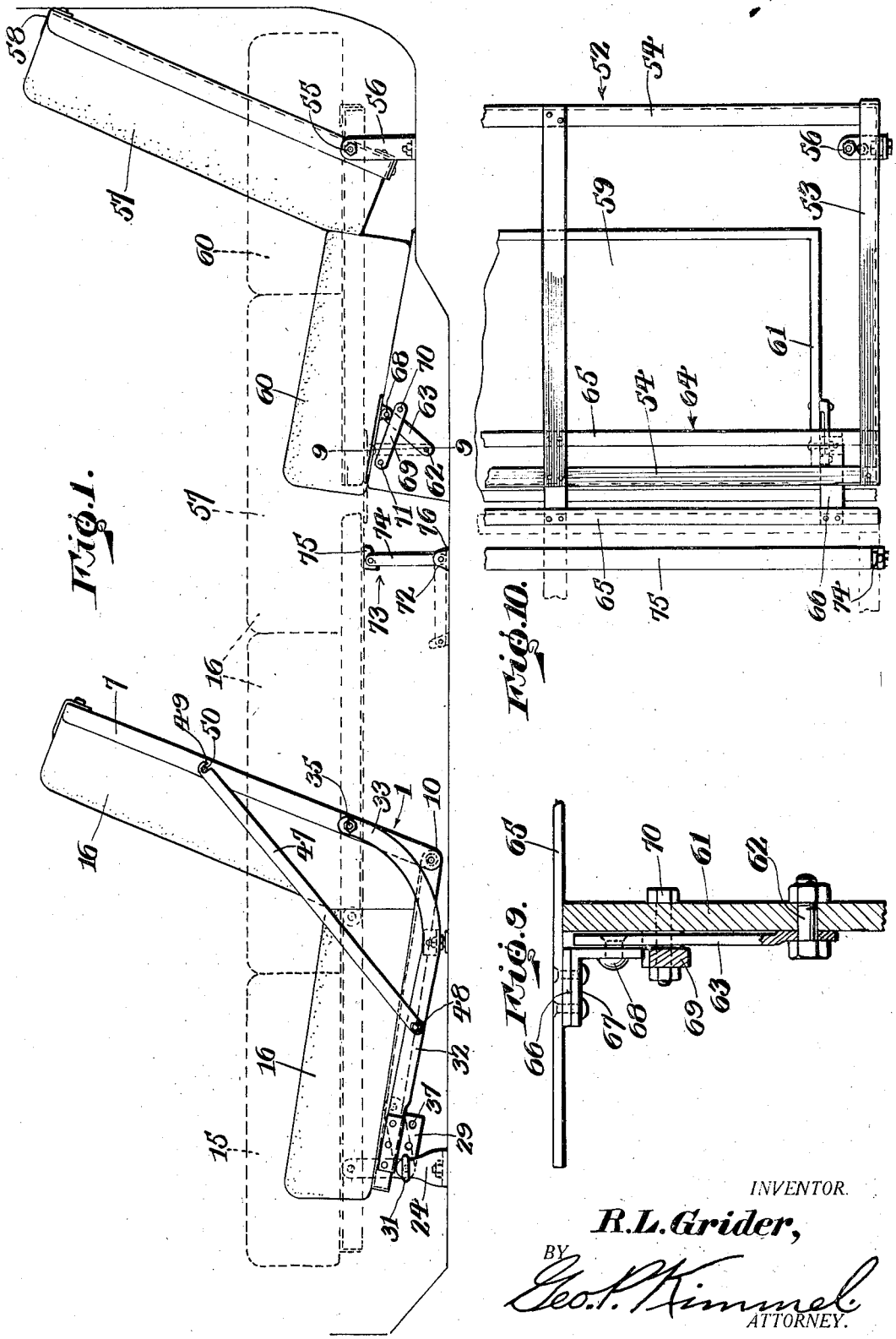

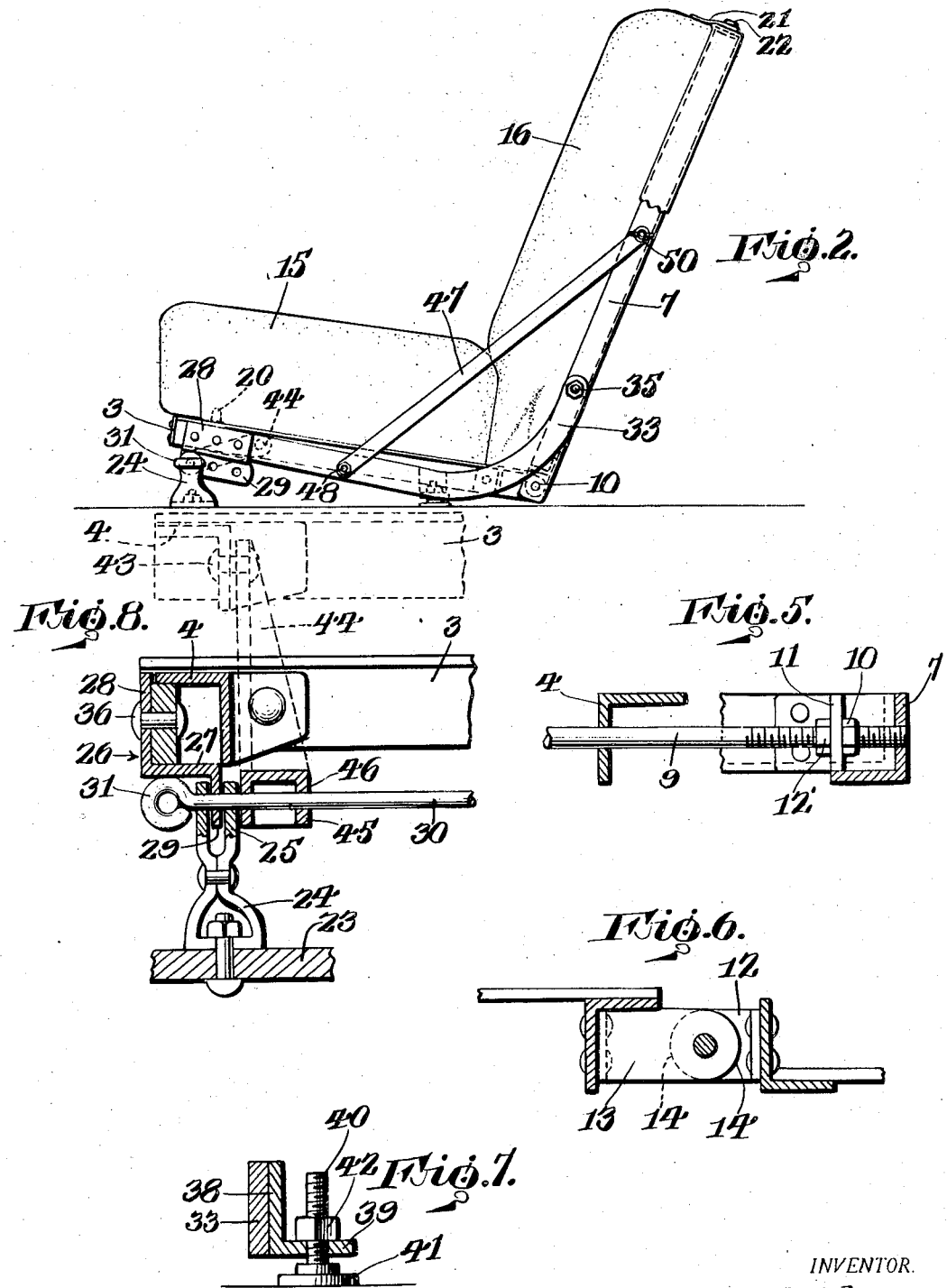

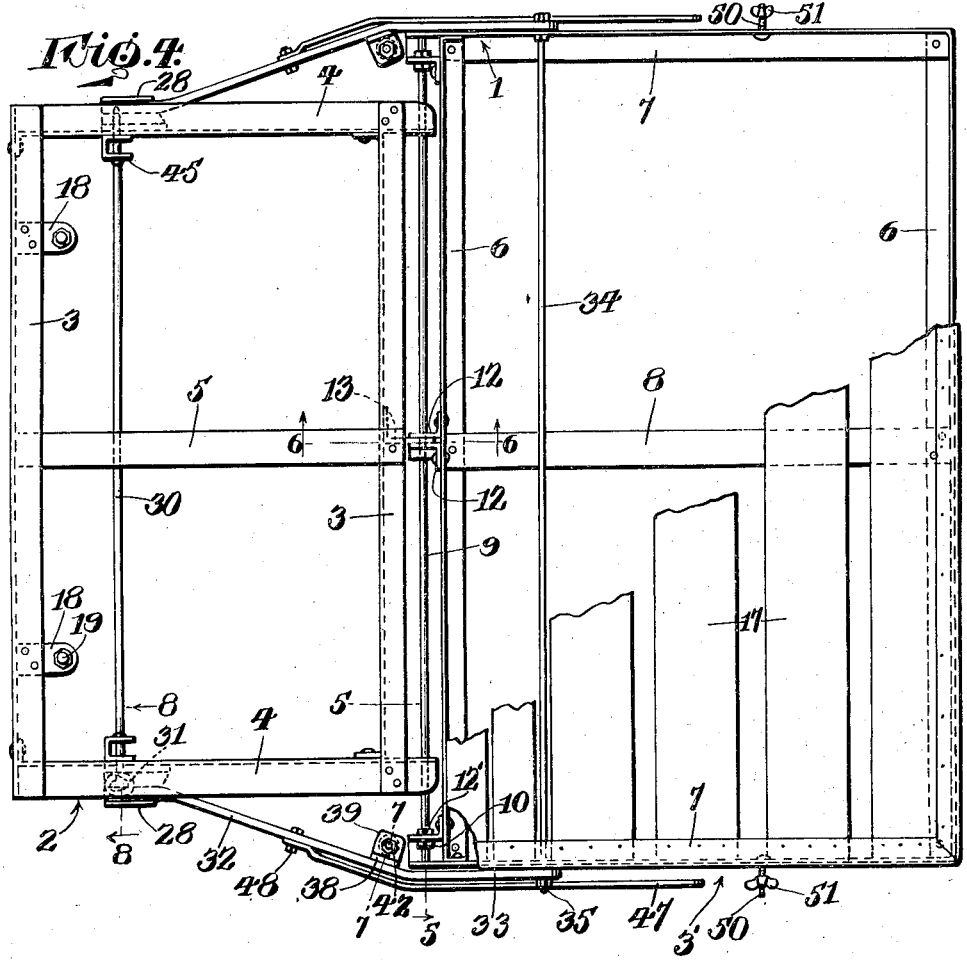

1,759,942

UNITED STATES PATENT OFFICE

RICHARD L. GRIDER, OF LAWRENCE, KANSAS

CONVERTIBLE AUTOMOBILE SEAT

Application filed October 15, 1928. Serial No. 312,621.

This invention relates to convertible automobile seats and has for its primary object to provide, in a manner as hereinafter set forth, a front and rear seat assembly for automobile bodies which may be conveniently and expeditiously converted into a comfortable, full length bed wherein the entire interior length of the body with which the seat assemblies are associated is utilized.

A further object of the invention is to provide a front and rear seat assembly as aforesaid which may be converted from seat position to bed position and vice versa with a minimum of physical effort, and which is constructed in a manner to maintain itself in its respective positions without the necessity of locking devices.

A further object of the invention is to provide a front and rear seat assembly as aforesaid which may be readily removed from the automobile body with which it is associated when it is desired to use such assembly in connection with a tent or the like.

A further object of the invention is to provide a front and rear seat assembly as aforesaid which is adapted for use as a folding bed anywhere such an article of furniture is needed and which may be readily carried as special equipment on a truck in order that a bed may be made up therein if desired.

A further object of the invention is to provide a front and rear seat assembly as aforesaid which, when adjusted in bed position, is spaced from the floor of the body with which it is associated, in order to provide a storage space under the bed for shoes, grips, and the like.

A further object of the invention is to provide a front and rear seat assembly as aforesaid, including as a part thereof, a frame assembly which may be constructed of any suitable material such as metal or wood and which may be adapted for use in connection with springs or cushions, or both, as desired.

A further object of the invention is to provide a seat assembly for automobiles which may be readily converted into a bed and of which, if desired, the front seat portion may be used in connection with a conventional rear seat to provide a bed, independently of the rear seat portion of such assembly.

With the foregoing and other objects in view the invention consists of the novel construction, combination and arrangement of parts as hereinafter more particularly described and illustrated in the acompanying drawings, wherein for the purpose of illustration is shown an embodiment of my invention, but it is to be understood that changes, variations and modifications may be resorted to which fall within the scope of the invention as claimed.

In the accompanying drawings in which like numerals are employed to designate like parts throughout the same:

Figure 1 is a side elevation of a front and rear seat assembly constructed in accordance with this invention, showing the same in seating position in full lines and in bed position in dotted lines.

Figure 2 is a slightly enlarged side elevation of the front seat assembly illustrated in Figure 1.

Figure 3 is a side elevation of the front seat assembly shown adjusted in bed position.

Figure 4 is a top plan of the front seat assembly shown in Figure 3 with the cushions removed.

Figure 5 is an enlarged section taken on line 5—5 of Figure 4.

Figure 6 is an enlarged section taken on line 6—6 of Figure 4.

Figure 7 is an enlarged section taken on line 7—7 of Figure 4.

Figure 8 is an enlarged section taken on line 8—8 of Figure 4.

Figure 9 is an enlarged section taken on line 9—9 of Figure 1.

Figure 10 is a top plan of the rear seat assembly in bed position and support therefor with the cushions removed.

Referring in detail to the drawings, the numeral 1 designates generally a front seat assembly which includes a seat frame indicated generally by the numeral 2 and a back frame indicated generally by the numeral 3'. The seat frame 2 consists of a pair of end members 3 which are disposed transversely of the body with which the seat assembly is associated and which are connected together at their ends by means of a pair of side members 4. The members 3 and 4 are preferably of angle iron construction and the side members 4 are of materially less length than the end members 3. Spaced midway between the side members 4, the end members 3 are connected together by means of a brace 5. The back frame 3' consists of a pair of end members 6 which are of greater length than the end members 3 and a pair of side members 7 which are of greater length than the side members 4. The members 6 and 7 are preferably formed of angle iron and the members 6 are connected, midway between the side members 7, by means of a brace 8.

The rearward ends of the side members 4 project beyond the rearmost end member 3 and the lower or forward ends of the side members 7 project beyond the lower or forward end member 6 whereby the rearward ends of the side members 4 and the lower or forward ends of the side members 7 are disposed in overlapping relation. The seat frame 2 and back frame 3' are hingedly connected by means of a rod 9 which extends in parallel relation to and between the end members 3 and 6, and extends through openings formed in the overlapping ends of the side members 4 and 7. The rod 9 is secured at the ends thereof to the back frame 3' by suitable nuts 10 and in the assembled relation of the frames 2 and 3', the side members 7 are offset and disposed outwardly with respect to the side members 4. Spaced from either end of the end members 6 is a bracket 11 through which the rod 9 extends and against which the nuts 10 abut. A lock nut 12' is provided on the rod 9 for abutment against each of the brackets 11 on the opposite side thereof from the nut 10. Midway between the ends thereof, the lower or forward end member 6 is provided with a pair of spaced brackets 12 between which projects a bracket 13 which is secured to the rearmost member 3. The brackets 12 and 13 are formed with rounded ends as indicated at 14 and adjacent their ends are perforated for the passage of the rod 9. In this manner a three point pivotal connection is provided between the frame members 2 and 3'. The frames 2 and 3 are adapted to be provided with any suitable means for supporting cushions 15 and 16 respectively, a plurality of slats 17 being illustrated in fragment in Figure 4 for this purpose. Any other suitable means for supporting the cushions 15 and 16 might be provided, such as springs similar to those used in ordinary bed frames.

Secured to the forward end members 3 is a pair of brackets 18, each of which is provided with a stud 19 for engagement with a socket 20 formed in the frame of the cushion 15. Secured to the upper or rearward end of the cushion 16 is a strap 21, by means of which the cushion is secured, as indicated at 22, to the upper or rearmost end member 6.

Mounted on the floor 23 of the automobile body with which my seat assembly is adapted to be associated is a pair of brackets 24, each of which is disposed beneath a side member 4, and each of which is formed with a bifurcated upper end 25. Carried by each bracket 24 is a connecting element indicated generally by the numeral 26 and comprising a horizontally disposed intermediate portion 27, an upturned end portion 28 and a downturned end portion 29. The downturned portions 29 of the connecting elements 26 are disposed between the bifurcated upper ends 25 of the brackets 24 and are hingedly connected thereto by means of a rod 30 which extends through aligned perforations formed in the members 29 and 25. One end of the rod 30 is curved in the form of a handle 31 for the ready manipulation of the same. Seated on each of the intermediate portions 27 of the connecting members 26 and bearing against the upturned end portions 28 of said members is a supporting member 32, which extends in a rearwardly and downwardly direction and the rearward end of which is curved upwardly in an arc 33. Spaced from the lower or forward ends thereof, the side members 7 of the back frame 3' are pivotally connected to the ends of the arc portions 33 of the supporting members 32 by means of a rod 34 which extends through aligned openings formed in the arc portions 33 and side members 7. Suitable nuts 35 are threaded on the ends of the rods 34, which bear against the outer faces of the arc portions 33 for securing the rods 34 in position.

The supports 32 are secured in any suitable manner such as by rivets 36 to the upturned end portions 28 of the connecting elements 26. The downturned portions 29 of the connecting elements 26 are provided with spaced openings 37 for the passage of the rod 30 therethrough, in order that the connecting elements 26 and supporting members 32 may be adjusted relative to the brackets 24. Adjacent the lowermost point thereof, each of the supporting members 32 has depending therefrom a bracket 38, which is formed with a portion 39 disposed in parallel relation to the floor 23. A threaded stud 40 has its head 41 seated on the floor 23 and is threaded through the horizontally disposed portion 39 of the bracket 38. By manipulation of the threaded studs 40 the height of each supporting member 32 may be varied as desired and held in adjusted position by means of a lock nut 42. Pivotally connected to each of the side members 4, as indicated at 43, is a link 44 which is of angle-iron construction at the end pivotally connected to the side member 4. The opposite end 45 of the link 44 is of channel iron construction and is provided with aligned openings 46 for the passage of the rod 30. The channel-iron or U-shaped end 45 of the link 44 provides a two-point bearing for the link and prevents any binding between the link 44 and rod 30. When the seat frame 2 is adjusted in seating position as illustrated in Figure 2 and in full lines in Figure 8, the side members 4 rest on the upper edges of the supporting members 32. When the frame assembly 2 is adjusted in bed position as illustrated in Figures 3, 4 and 8, the links 44 are disposed substantially in a vertical direction and the side members 4 are supported a material distance above the supporting members 32.

When the back frame 3' is swung rearwardly about its pivotal supporting rod 34, the lower or forward end of the frame 3' is moved in a forward and upward direction and the rearward end of the frame member 2 is moved thereby in a forward and upward direction whereby the links 44 are pivoted about the rods 30 and the forward end of the frame member 2 is elevated to the position shown in dotted lines in Figure 8. When the seat assembly 1 is adjusted in seating position as illustrated in Figure 2, the weight of the occupant upon the seat automatically holds the back frame 3' in position. To provide for additional rigidity of the back frame 3' when adjusted in seating position, I provide a pair of braces 47, one end of each of which is pivotally connected as indicated at 48 to a supporting member 22 and the other end of which is recessed as at 49 for engagement with a stud 50 projecting from a side member 7. The stud 50 is threaded for the reception of a wing nut 51 to hold the brace 47 in position.

The back seat assembly includes a back frame indicated generally by the numeral 52 and consists of a pair of side members 53 and a pair of end members 54. Spaced from the lower ends thereof, the side members 53 are pivotally connected, by means of suitable bolts 55, to a pair of brackets 56 which are mounted on the floor 23. The back frame 52 is provided with a cushion 57 which is secured to the uppermost end member 54 by means of a suitable strap 58. Mounted forwardly of the brackets 56 is a seat support 59, which is ordinarily used as a tool compartment, and upon which is seated the seat cushion 60. Secured to each side wall 61 of the supports 59, by means of a pivot pin 62, is a link 63.

Normally seating on the supports 59 is a supporting frame indicated generally by the numeral 64 and comprising a pair of end members 65 and a pair of side members 66. Depending from each side member 66 is a bracket 67, to which is pivotally connected, by means of a suitable pin 68, the upper end of a link 63. Secured to each side wall 61 and spaced therefrom is a guide member 69, between which and the side wall 61 the link 63 is disposed. The link 63 is adapted to pivot about its pin 62 and the movement thereof is limited at the opposite ends of its path of travel by the bolts 70 and 71 which secure the guide member 69 to the side wall 61.

Spaced from the supports 59, a pair of brackets 72 are mounted on the floor 23 and pivotally connected to the brackets 72 is a foot rest indicated generally by the numeral 73. The foot rest 73 comprises a pair of supporting legs 74 by means of which the foot rest is pivoted to the brackets 72 and a cross piece 75 connecting the free ends of the legs 74. Adjacent its point of pivotal connection with a bracket 72, each of the legs 74 is provided with a stop 76 which abuts against the floor 23 to maintain the foot rest 73 in a substantially vertical position when the foot rest is swung rearwardly about its pivot.

When it is desired to convert my seat assembly from the position shown in full lines in Figure 1 to the position shown in dotted lines therein, the cushions 57 and 60 are removed from the rear seat assembly and the frame 52 is swung in a forward direction about its pivot 55. The supporting frame 64 is moved forwardly by moving the links 63 about their pivots and the rearmost end members 65 of the supporting frame 64 is thereby placed in position for supporting the forward end of the frame 52. The braces 47 are disengaged from the studs 50 and the back frame 3' is swung about the rods 34 in a rearward direction until the upper or rearward end of the frame 3' rests on the forward end member 65 of the supporting frame 64.

Moving the back frame 3' about the rod 34 in a rearward direction automatically positions the seat frame 2 and the cushions 15 and 16 in the position illustrated in Figure 3 in a manner as heretofore described. To complete the bed the cushion 57 is placed partly on the frame 3' and partly on the frame 52 and the cushion 60 is placed on the frame 52 rearwardly of the cushion 57. The bed is thus completed and the frame thereof is raised a substantial distance from the floor 23 as indicated in Figure 1, whereby storage space is provided between the frame of the bed and the floor 23.

In the event of the body of the automobile being of such length that the back frame 3' in its lowered position will not reach the supporting frame 64, the foot rest 73 may be raised to its vertical position and the frame 3' rested on the cross piece 75 thereof, as illustrated in Figure 10.

The foot rest 73 may be also utilized for supporting the back frame 3', if it should be desired to use the front seat assembly 1 in connection with the conventional type of rear seat. Likewise the front seat assembly 1 may be used in connection with the conventional type of rear seat by supporting the back frame 3' on the forward edge of the rear seat support.

It is to be understood that the form of my invention herewith shown and described is to be taken as a preferred example of the same and that various changes in the details of construction may be resorted to without departing from the spirit of the invention or the scope of the appended claims.

What I claim is:

1. A device of the character described, comprising a seat frame, a back frame pivoted at its lower end to the rearward end of said seat frame, a base having a fixed pivotal connection with the back frame intermediate the upper and lower ends of the latter, and a link having its respective ends pivotally connected with said seat frame, and base.

2. A device of the character described comprising, a seat frame, a back frame pivoted at its lower end to the rear end of said seat frame, a base, means connecting the seat frame to the base to permit the seat frame to move relative to said base, and a fixed pivotal connection between the base and back frame intermediate the upper and lower ends of the latter and coacting with the pivotal connection between the back and seat frame to provide for an upward and forward movement of the seat frame upon the exertion of a rearward pressure on the upper end of the back frame.

3. In a device of the character described, a pair of seating devices, each including a seat frame and a back frame pivotally connected to the seat frame, said back frames being movable about their pivots in converging directions, and means for arresting the converging movement of said back frames and for maintaining them in horizontal alignment to provide the central portion of a bed frame.

4. In combination with a front seat assembly having a back frame movable in a rearward arc to a horizontal position to provide a portion of a bed frame, a rear seat assembly having a pivoted back frame movable in a forward arc to a horizontal position to provide an adjacent portion of the bed frame.

In testimony whereof, I affix my signature hereto.

RICHARD L. GRIDER.